Patented Apr. 8, 1941

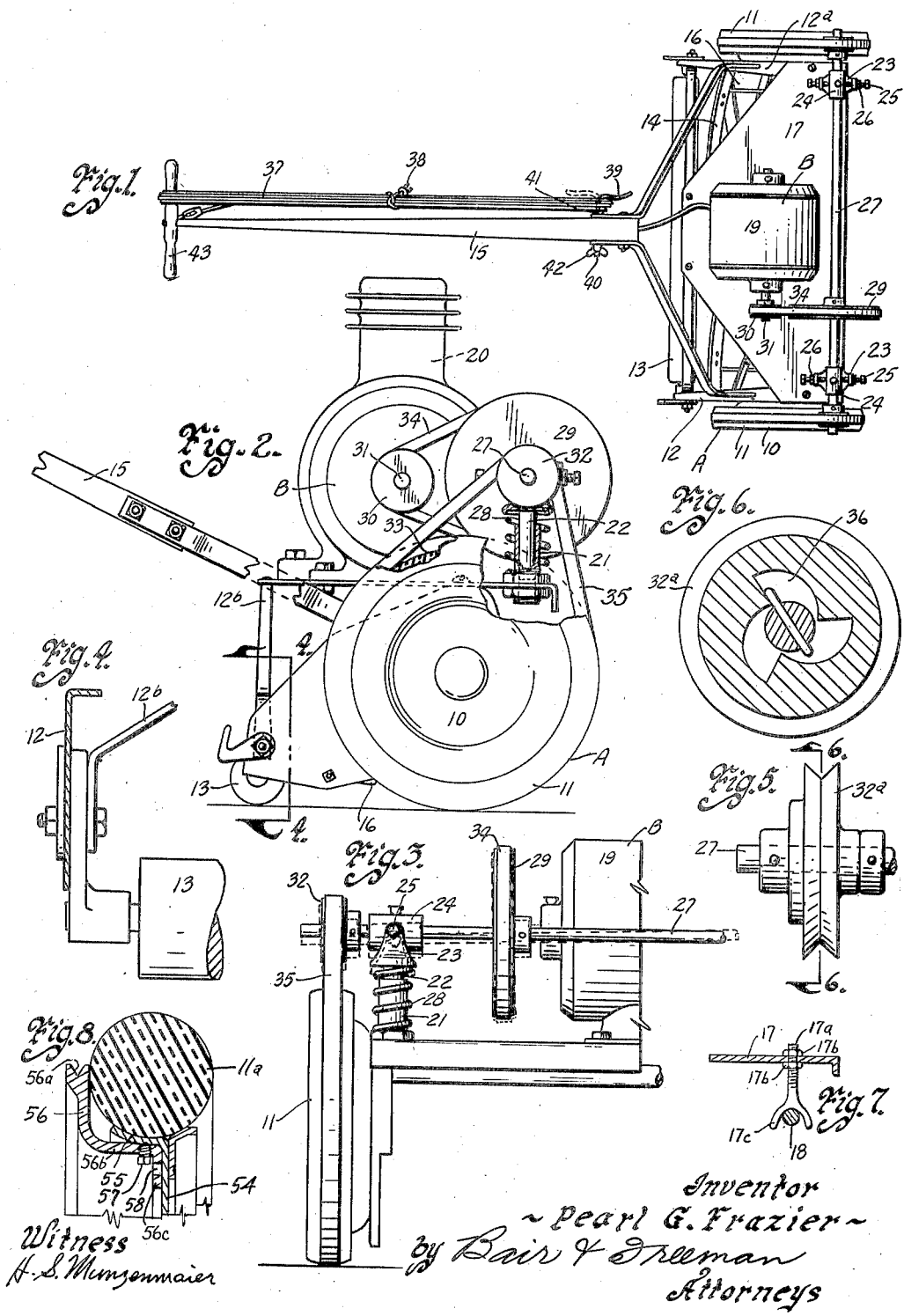

2,237,521

UNITED STATES PATENT OFFICE 2,237,521

POWER UNIT FOR DRIVING LAWN MOWERS

Pearl G. Frazier, Altoona, Iowa

Application November 6, 1939, Serial No. 303,062

7 Claims. (Cl. 180—19)

My invention relates to a power unit which can be quickly, simply and easily assembled on a lawn mower for operating the mower.

It is my object to provide such a power unit having parts conveniently assembled and related for installation on a lawn mower for operating the mower.

One of the purposes of my invention is to provide such a unit which will be quickly and readily detachable.

More particularly it is my object to provide such a unit having parts so constructed and arranged that when the unit is installed on the mower, the mower traction wheels can be driven from the unit.

Another particular object is to provide such a unit having its parts arranged to allow for adequate flexibility between the mower traction wheels and the parts of the unit, thereby permitting free operation of the unit and the mower under all working conditions and to eliminate any improper binding of the parts.

Another particular object is to provide the unit including an operating shaft adapted to be connected with both traction wheels of the mower and supported by yielding means, whereby belts connecting the unit and the traction wheels may be held sufficiently taut under all conditions of operation.

A further object is to provide simple and effective means for mounting the power apparatus on the mower.

Still a further object is to provide a demountable pulley adapted to be mounted on a mower wheel, to further the purpose of providing a power plant unit which can be readily assembled on a standard lawn mower.

With these and other objects in view, my invention consists in the construction, arrangement and combination of the various parts of my device whereby the objects contemplated are attained, as hereinafter more fully set forth, pointed out in my claims and illustrated in the accompanying drawing, wherein:

Figure 1 is a top or plan view of a lawn mower equipped with a power driving unit embodying my invention;

Figure 2 is a side elevation of a lawn mower equipped with my unit, parts being broken away and parts being shown in section, the prime mover being illustrated as an internal combustion engine;

Figure 3 is a front elevation of one end of the mower, parts being omitted;

Figure 4 is a vertical detailed sectional view taken on the line 4—4 of Figure 2;

Figure 5 is a front elevation of an alternate form of pulley on the countershaft of my unit;

Figure 6 is a vertical, sectional view taken on the line 6—6 of Figure 5;

Figure 7 is a vertical, sectional view illustrating one arrangement for supporting the platform on the mower frame;

Figure 8 is a vertical sectional view of the mower wheel with my demountable pulley assembled on it.

In the drawing herewith I have shown my unit installed on a mower, the details of the parts of the mower being shown only for the purpose of illustrating the relationship of the unit to the mower.

In the drawing I have shown a mower indicated generally at A and my unit indicated generally at B. The mower has the usual traction wheels 10 which are provided with solid rubber tires 11. The mower frame is indicated at 12 and the roller at 13 and the reel at 14. Connected with the mower frame is the ordinary handle 15. The cutter bar is indicated at 16.

My improved power unit includes a platform 17. This platform 17 is preferably detachably supported on the mower frame and may be mounted on the mower frame in different ways, depending upon the particular structure of the frame on the mower on which the power unit is supported.

In Figures 1, 2 and 3 I have shown the platform bolted to the end plates 12a and to a front motor frame member 12b.

In Figure 7 I have shown the platform 17 supported on the rod 18 which connects the end plates of many mowers. Extended through the front part of the platform are threaded upright posts 17a on which are adjustable nuts 17b above and below the platform, so that the platform can be adjusted. The lower ends of the posts have yokes 17c to receive the rod 18. The rear part of the platform shown in Figure 7 may rest on the cross frame member 12b or any suitable available part of the mower frame. Mounted on the platform 17 is a prime mover 19 shown in Figure 1 as an electric motor.

In Figure 2 I have shown diagrammatically a gasoline engine 20. Bolted to the forward part of the platform are laterally spaced upright sleeves 21. Telescopically received in these sleeves 21 are supporting posts 22 having at their upper ends yokes 23. The yokes 23 support bearings 24. Mounted in the arms of the yokes 23 are screws 25, the ends of which are countersunk in the bearings 24. The screws 25 are locked in place by lock nuts 26. The bearings 24 carry the countershaft 27.

On the sleeves 21 below the yokes 23 are coil springs 28 of such size and arrangement that the yokes 23 are yieldingly supported and may have a slight up-and-down play against the tension of these springs. The arrangement of screws 25 is such as to permit slight rocking movement of the bearings 24 and the countershaft 27. On the countershaft 27 is fixed a grooved pulley 29 aligned with a grooved pulley 30 on the shaft 31 of the prime mover 19—20. On the outer ends of the shaft 27 are grooved pulleys 32. The rubber tires 11 of the wheels 10 are grooved as at 33.

The parts heretofore described are so arranged that the pulleys 29 and 30 carry the V-belt 34 and the respective grooved tires 11 carry the V-belts 35.

In Figures 5 and 6 is shown a slightly modified arrangement in which, instead of the pulleys 32 I have shown two-part pulleys 32a. Pulleys 32 are fixed to the shaft 27 but the pulleys 32a are associated with the shaft 27 by means of a conventional ratchet arrangement 36.

Connected with the motor 19 is the ordinary so-called electric cord 37 having at its free end a plug 38. At the lower part of the handle 15 is a hook 39 having a straight portion 40 extended through the handle. On the straight portion 40 is a shoulder 41 adjacent one side of the handle 15 and the other end of the portion 40 is threaded to receive a wing nut 42. The hook 39 may be turned toward the mower proper and the wing nut 42 tightened and thereupon the length of cord 37 may be wound on the handle 42 and the hook 39 as illustrated in Figure 1. If it is desired to release the coil, the wing nut 42 may be loosened and then the hook can be turned from its full line position of Figure 1 to its dotted line position of that figure. Thereupon the coil of the cord can be quickly and conveniently released for connecting the plug 38 with the ordinary line wires.

It will be understood that at some suitable point a switch is provided for control by the user of the mower.

One of my purposes is to so build the power plant and its associated parts as to facilitate assembling the power plant on a standard mower. To this end I have provided a demountable pulley adapted to be assembled on the wheel of an ordinary mower. In Figure 8 is shown the wheel 54 with its rubber tire 11a on the rim 55. A demountable pulley 56 has a groove 56a in its periphery to receive a V-belt.

The pulley 32 is adjustable on the shaft 27 so that it may be readily aligned with the demountable pulley 56.

The pulley 56 has an annular horizontally projecting flange 56b adapted to fit inside the wheel rim 55 as illustrated, and terminating in a vertical flange 56c.

The flange 56b of the pulley 56 may be secured to the flange 55 of the wheel 54 by set screws 57.

For certain kinds of mower wheels the flange 56c of the demountable pulley is provided with holes 58 to receive bolts for fastening the rim to the wheels.

Operation

In the actual operation of my improved machine, the cord 37 is connected with the source of power or gasoline engine 20 is started.

When the motor 19, for example, is started, power will be transmitted to the countershaft 27 and thence to the motor wheels 10. The parts are so geared that the mower will then travel at approximately the same speed that is given to it when it is being operated by hand.

From the foregoing it will be seen that the arrangement here described has a number of important advantages. The power unit may be quickly and easily mounted on or removed from the mower. When the power unit is not on the mower, the mower unit can be used in the ordinary way. Power from the unit is applied to the wheels so that the reel is operated just as it would be if no power unit were employed.

The shaft 27 can slide in the bearings 24.

By means of the telescoping members 21 and 22 in the springs 28 and the yokes 23 and the bearings 24, there is provided a floating mounting for the countershaft 27 and obviously the V-belts 35 will always be held properly taut. Furthermore, there is allowed adequate flexibility to permit the efficient operation of the parts under all working conditions and there is no danger of such binding as might otherwise impose undue wear on the working parts. For example, if the wheels 11 should be a little out of true or in cases of variations in the sizes of the tires or variations due to wear, there is afforded adequate flexibility while maintaining the belts 35 tight enough for proper operation.

Some changes may be made in the construction and arrangement of the parts of my device without departing from the real spirit and purpose of my invention and the scope of my claims, and it is my intention to cover by my claims any modified forms of structure or use of mechanical equivalents which may be reasonably included within their scope without sacrificing any of the advantages thereof.

I claim as my invention:

1. For use with a lawn mower having a frame and traction wheels, a power unit for driving the mower, comprising a platform support adapted to be mounted on the mower frame, a prime mover on the platform support having a power shaft, a countershaft, means for mounting the countershaft on the platform support including means for yieldably tending to move the countershaft away from the traction wheels of the mower, means for operating the countershaft from the power shaft, pulleys on the countershaft, and belts for driving the mower traction wheels from the pulleys on the countershaft.

2. For use with a lawn mower having traction wheels, a power unit for driving the mower, including a platform support, means for mounting the platform support on the mower, a prime mover on the platform support having a power shaft, a countershaft, means transmitting motion from the power shaft to the countershaft, means including belts for transmitting motion from the countershaft to the traction wheels, and means for supporting the countershaft on the platform support, said last means including, means tending to move the countershaft away from the traction wheels of the mower for thereby holding the belts taut.

3. For use with a lawn mower having traction wheels, a power unit for driving the mower, including a platform support, means for mounting the platform support on the mower, a prime mover on the platform support having a power shaft, a countershaft, means transmitting motion from the power shaft to the countershaft, means including endless flexible members for transmitting motion from the countershaft to the traction wheels, and means for supporting the countershaft on the platform support, said last means including telescoping members between the countershaft and support, and spaced yielding elements near the opposite ends of the countershaft tending to spread the telescoping members and tending to move the countershaft away from the traction wheels to hold both the endless flexible members taut under working conditions.

4. For use with a lawn mower having traction wheels, a power unit for driving the mower, including a platform support, means for mounting the platform support on the mower, a prime mover on the platform support having a power shaft, a countershaft, means transmitting motion from the power shaft to the countershaft, means including endless flexible members for transmitting motion from the countershaft to the traction wheels, and means for supporting the countershaft on the platform support, said last means including upright members on the support, bearings for the countershaft, upright members pivoted to the bearings and telescopically connected with the first upright members, springs interposed between the respective first-named and second-named upright members, whereby vertical and tilting movement of the countershaft is permitted.

5. For use with a lawn mower having traction wheels, a power unit for driving the mower, including a platform support, means for mounting the platform support on the mower, a prime mover on the platform support having a power shaft, a countershaft, means for driving the countershaft from the prime mover, means including endless flexible members for transmitting motion from the countershaft to the traction wheels, and means for supporting the countershaft on the platform support, said last means including bearings for the countershaft, upright members on the support, upright members pivoted to the bearings and telescopically connected with the first upright members, and yielding elements tending to spread the telescoping members for supporting the countershaft and tending to move it away from the traction wheels to hold both the endless flexible members taut under working conditions, the arrangement permitting vertical and tilting movement of the countershaft.

6. An apparatus for driving a mower having traction wheels, comprising a platform, a prime mover and a transverse countershaft on the platform, means including flexible endless members for operatively connecting the countershaft with the prime mover and for operatively connecting the countershaft with the traction wheels of a mower, and means for yieldingly supporting the countershaft on the platform for allowing the shaft to tilt, so as to maintain the flexible members taut.

7. In an apparatus for driving a lawn mower, a shaft, pulleys thereon, belts for driving the lawn mower wheels from the pulleys, means for supporting the shaft comprising yielding elements arranged to push the ends of the shafts so as to maintain the belts taut and permit the shaft to tilt from end to end.

PEARL G. FRAZIER.